United States Patent
Lalancette et al.

(10) Patent No.: US 9,206,492 B2
(45) Date of Patent: Dec. 8, 2015

(54) CLOSED LOOP METHOD FOR GOLD AND SILVER EXTRACTION BY HALOGENS

(71) Applicant: Dundee Sustainable Technologies Inc., Montreal (CA)

(72) Inventors: Jean-Marc Lalancette, Sherbrooke (CA); Bertrand Dubreuil, Trois-Rivières (CA); David Lemieux, Thetford Mines (CA)

(73) Assignee: Dundee Sustainable Technologies Inc. (CA)

( * ) Notice: Subject to any disclaimer, the term of this patent is extended or adjusted under 35 U.S.C. 154(b) by 133 days.

(21) Appl. No.: 14/206,406

(22) Filed: Mar. 12, 2014

(65) Prior Publication Data
US 2015/0259765 A1 Sep. 17, 2015

(51) Int. Cl.
*C22B 3/10* (2006.01)
*C22B 3/44* (2006.01)
*C22B 11/06* (2006.01)
*C25B 1/26* (2006.01)
*C25B 1/24* (2006.01)

(52) U.S. Cl.
CPC . *C22B 11/06* (2013.01); *C22B 3/44* (2013.01); *C25B 1/24* (2013.01); *C25B 1/26* (2013.01)

(58) Field of Classification Search
CPC ............ C22B 3/10; C22B 3/44; C22B 11/06; C22B 11/04; C25B 1/26
See application file for complete search history.

(56) References Cited

U.S. PATENT DOCUMENTS

| | | | |
|---|---|---|---|
| 649,962 | A | 5/1900 | Smith et al. |
| 3,819,504 | A | 6/1974 | Benett |
| 4,342,592 | A | 8/1982 | Lamb |
| 6,274,045 | B1 * | 8/2001 | Kreisler ............ C02F 1/54 210/710 |
| 7,537,741 | B2 * | 5/2009 | Lalancette ............ C22B 3/10 423/101 |
| 9,051,626 | B2 * | 6/2015 | Lalancette ............ C22B 11/06 75/744 |
| 2004/0156765 | A1 | 8/2004 | Lalancette |
| 2008/0112864 | A1 | 5/2008 | Lalancette |
| 2009/0013829 | A1 | 1/2009 | Harris et al. |
| 2013/0074655 | A1 | 3/2013 | Lalancette et al. |
| 2013/0089378 | A1 * | 4/2013 | Theodore ............ C22B 3/18 405/128.5 |

FOREIGN PATENT DOCUMENTS

| | | |
|---|---|---|
| CA | 2642618 | 8/2007 |
| CA | 2636122 | 9/2009 |
| CN | 102002600 A | 4/2011 |
| WO | WO-02/42503 | 5/2002 |
| WO | WO-2012/149631 | 11/2012 |
| WO | WO-2013/044380 | 4/2013 |

OTHER PUBLICATIONS

Ping et al. CN 102002600A published Jul. 2011. Machine translation.*
"European Application Serial No. 12834685.5, extended European Search Report mailed Jun. 25, 2015", 8 pgs.
Puvvada, G. V. K., et al., "Chloride Metallurgy: PGM Recovery and Titanium Dioxide Production", *JOM*, vol. 55, No. 8, (2003), 38-41.

* cited by examiner

Primary Examiner — George Wyszomierski
Assistant Examiner — Tima M McGuthry Banks
(74) Attorney, Agent, or Firm — Schwegman Lundberg & Woessner, P.A.

(57) ABSTRACT

A method for extracting precious metals from a polymetallic ore, comprising a) generating hypochlorites from a salt brine; b) chlorination of the ore using hypochlorites under acidic conditions; c) filtering to collect a pregnant solution and treating the pregnant solution for collection of precious metals; d) filtering to separate the precious metals and a barren brine; e) purifying the barren brine; and f) recycling halogens from the purified brine in the form of hypohalites formed by electrolysis of the purified brine, and comprising hypochlorite and hypobromite; step b) further comprising scrubbing excess halogens using calcium hydroxide; treating the pregnant solution in step c) comprises reducing an oxydo reduction potential of the pregnant solution and using calcium hydroxide for neutralization; and step e) comprising increasing the pH of the barren brine by addition of calcium hydroxide.

13 Claims, 2 Drawing Sheets

CLOSED LOOP METHOD FOR GOLD AND SILVER EXTRACTION BY HALOGENS

FIELD OF THE INVENTION

The present invention relates to method for gold and silver extraction by halogens. More specifically, the present invention is concerned with an improved closed loop method for gold and silver extraction by halogens.

BACKGROUND OF THE INVENTION

The extraction of gold and silver from polymetallic ores using halogens in brine (NaCl/NaBr in water) has been reported (U.S. Pat. No. 7,537,741).

A closed loop method for extracting precious metals from an ore, using halogens has also been developed, where the halogens (chlorine and bromine) are used as free halogens at the time of extracting the precious metals and are recycled by electrolysis of the barren solution in the form of hypohalides, i.e. sodium hypochlorites NaOCl and sodium hypobromites NaOBr (US Patent application 2013/0074655). The free halogens are liberated from the hypohalide state by operating the leaching under acidic conditions. The following equation summarizes the main steps of this closed loop method, which is illustrated in FIG. 1.

Liberation of free halogens from hypohalides

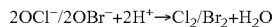
$$2OCl^- / 2OBr^- + 2H^+ \rightarrow Cl_2 / Br_2 + H_2O$$

Gold extraction with halogens mixture

$$3Br_2 + Ore(Au) \rightarrow 2AuBr_3 + Ore(depleted)$$

$$3AuBr_3 + 3Cl_2 \rightarrow AuCl_3 + 3Br_2$$

Collection of gold

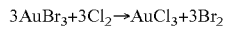
$$2AuCl_3 + reducer \rightarrow 2Au^\circ + 6Cl^-$$

Regeneration of hypohalides from barren solution

$$6Cl^- + electrooxidation \rightarrow 6OCl^-$$

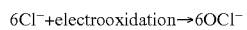
$$6Br^- + electrooxidation \rightarrow 6OBr^-$$

In these various reactions, the anions, either halides or hypohalides, are carried by sodium as cations, i.e. NaCl, NaBr, NaOBr or NaOCl.

The implementation of this method involves the recycling of halogens, particularly the more expensive bromine. The liberation of the free halogens under acidic conditions generates an atmosphere rich in chlorine and bromine. The operation being conducted at atmospheric pressure, the excess halogens must be scrubbed, typically with sodium hydroxide NaOH, in order to recover these halogens for recycling. Vapors that accompany the filtration of the pregnant solution may also contain a small but significant amount of halogens that must be recovered for economic and environmental reasons. This is the first instance where addition of a chemical such as sodium hydroxide NaOH is required in the method.

A second instance of chemical addition in the method occurs at the time of collection of the gold dissolved in the pregnant solution, when a reducer is used to bring down the trivalent gold to an elemental state. This operation is achieved by reducing the Oxidation-Reduction Potential (ORP) from values in the range of 1000 mV to less than 400 mV vs a Ag/AgCl reference electrode. The reducer, either sodium sulfite $Na_2SO_3$ or sulfur dioxide gas $SO_2$, involves sodium addition directly from the $Na_2SO_3$ or from the neutralization of the excess and oxidized $SO_2$ (to $H_2SO_4$) with sodium hydroxide NaOH.

A third instance is after the gold collection, when the barren brine which has collected impurities, i.e. mainly iron, from the ore, must be purified before recycling by electrolysis. This purification is done by pH adjustment with sodium hydroxide in order to precipitate iron and other traces of base metals followed by a treatment with sodium carbonate $Na_2CO_3$ to bring down the calcium content to a level acceptable at the time of electrolysis.

Therefore at three steps in the above method, namely, at the time of scrubbing the off gases from the chlorination reactor, when precipitating the gold from the pregnant solution and at the time of the purification of the barren solution, the use of sodium hydroxide leads to an unavoidable accumulation of sodium. This sodium exists as sodium sulfate, since the acid used in the reactor is sulfuric acid $H_2SO$ and the reducer for gold precipitation is sulfur dioxide $SO_2$ (see FIG. 1).

Removing sodium sulfate by crystallization is a known process but it is relatively expensive in capital and operation costs. Moreover, such a step eliminates the closed loop character of the method. Therefore, it was found highly desirable to improve upon these operational conditions that led to sodium build-up.

There is still a need in the art for a method and system for gold and silver extraction using halogens.

SUMMARY OF THE INVENTION

More specifically, in accordance with the present invention, there is provided a method for extracting precious metals from a polymetallic ore, comprising a) generating hypochlorites from a salt brine; b) chlorination of the ore using hypochlorites under acidic conditions; c) filtering to collect a pregnant solution and treating the pregnant solution for collection of precious metals; d) filtering to separate the precious metals and a barren brine; e) purifying the barren brine; and f) recycling halogens from the purified brine in the form of hypohalites formed by electrolysis of the purified brine, and comprising hypochlorite and hypobromite; step b) further comprising scrubbing excess halogens using calcium hydroxide; treating the pregnant solution in step c) comprises reducing an oxydo reduction potential of the pregnant solution and using calcium hydroxide for neutralization; and step e) comprising increasing the pH of the barren brine by addition of calcium hydroxide.

Other objects, advantages and features of the present invention will become more apparent upon reading of the following non-restrictive description of specific embodiments thereof, given by way of example only with reference to the accompanying drawings.

DESCRIPTION OF EMBODIMENTS OF THE INVENTION

Figure 1:
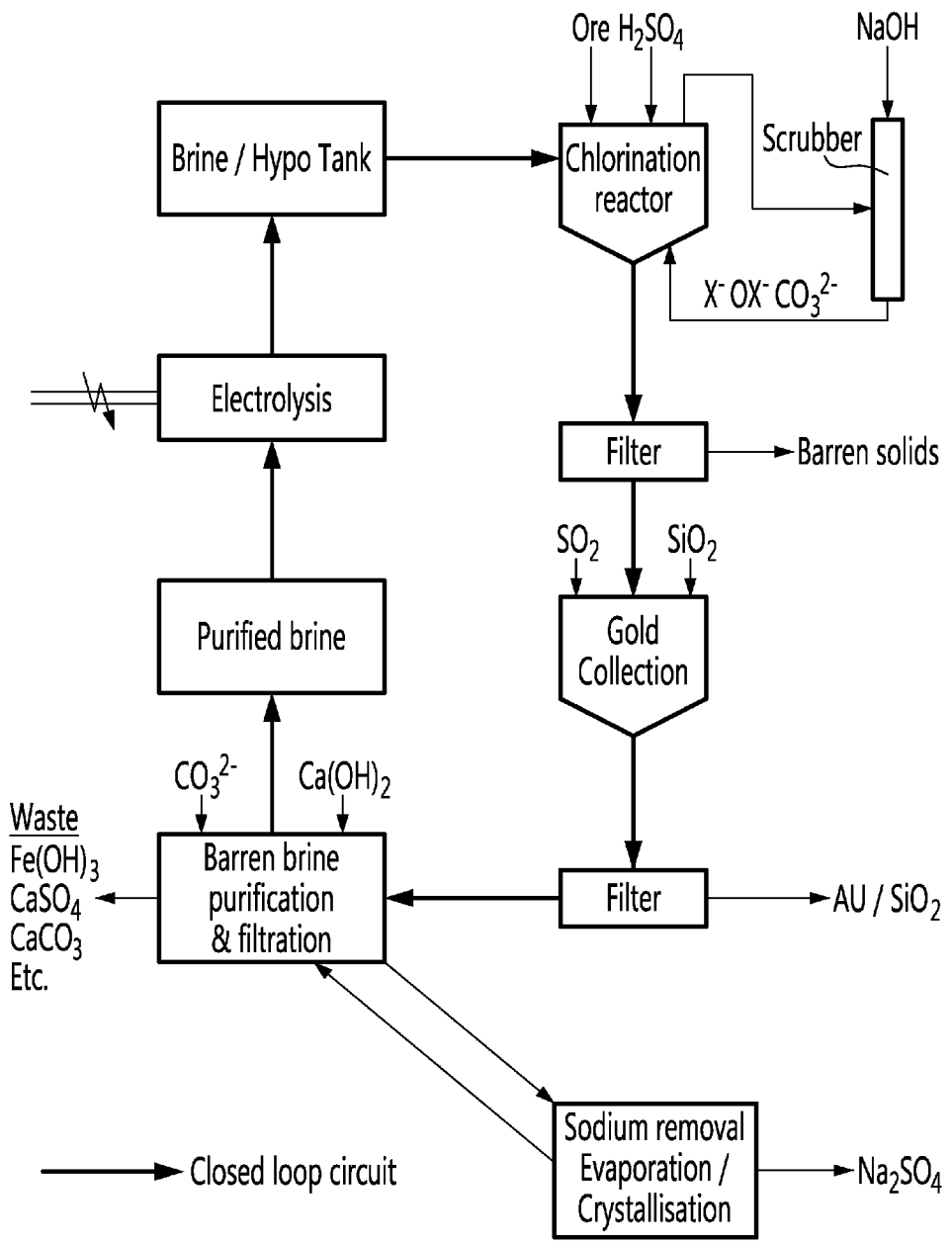
FIG. 1 is a diagrammatic view of a method for gold extraction using halogens as known in the art.

In a method for gold and silver extraction using halogens, it has been discovered that sodium build-up could be avoided by using a base such as calcium hydroxide $Ca(OH)_2$ rather than sodium hydroxide NaOH i) at the time of scrubbing the off gases from the chlorination reactor, ii) when precipitating the gold/silver from the pregnant solution and iii) at the time of the purification of the barren solution, thereby providing a cost effective closed loop method.

In a sulfuric acid condition, the resulting neutralization leads to calcium sulfate (gypsum, $CaSO_4.2H_2O$), which has a very low solubility in water and can be filtered off easily.

The use of calcium hydroxide called for the preparation of a slurry of this base which has a tendency to settle, and since the resulting product, gypsum, is not soluble, there was always coating formation of this gypsum around non reacted calcium hydroxides and other particulates in the reaction mixture. This situation called for the use of excess amounts of calcium hydroxide, since a stoichiometric approach would lead to a base deficiency because of this encapsulation of calcium hydroxides or lime by gypsum. Also, encapsulation could prevent the reaction of gold-bearing particulates with chlorinating species.

Another matter of concern with the use of calcium hydroxide as a base was the possibility of co-precipitation of some of the bromide ion in the brine with the gypsum. Such a phenomenon, even at a very low level, would be highly detrimental to the economics of the method because of the relatively high cost of bromine or bromides.

Therefore, the use of calcium hydroxide, although desirable to prevent ionic build-up in the brine, had the potential drawback of preventing the efficient gold/silver extraction and the recycling of the bromides.

The three instances of use of a base in the method for gold extraction using halogens was thus examined, and conditions of its optimal use to avoid these potential drawbacks were determined.

First, at the time of scrubbing the halogens from the chlorinating reactor, a calcium hydroxide $Ca(OH)_2$ slurry with $Ca(OH)_2$ content in a range between 2 and 10% in weight, preferably 5%, was used to recover the halogens values from the chlorination reactor.

Such a recovery can be described by the following equations:

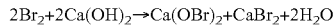

$$2Br_2+2Ca(OH)_2 \rightarrow Ca(OBr)_2+CaBr_2+2H_2O$$

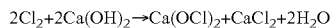

$$2Cl_2+2Ca(OH)_2 \rightarrow Ca(OCl)_2+CaCl_2+2H_2O$$

During this recovery of the halogens values from the chlorination reactor, half of the calcium involved thus exists as calcium hypohalides $Ca(OBr)_2$, $Ca(OCl)_2$. These hypohalides can be recycled to the chlorination reactor in order to recuperate the halogens values. Surprisingly, it was noted that in spite of the acid conditions in the chlorination reactor, the hypohalides of calcium turned out to be very efficient for the dissolution of gold. Therefore, half of the scrubbed halogens values were turned into useful hypohalides without need of electrolysis. There is thus provided a first halogens recycling step.

The anticipated potential problems of encapsulation were not encountered, most likely because of the grinding effect of the slurried and well-stirred ore on the gypsum, which appeared in the reactor, maintained acidic with sulfuric acid, at the time of addition of the recycled hypohalides from the scrubbing step described hereinabove. The barren ore, along with the gypsum, could be filtered off to obtain the pregnant solution with full gold and halogen values and, interestingly, without added sodium content.

Many ores contain carbonates and the acidic conditions in the reactor liberate carbon dioxide that is evacuated along with the halogens vapors. When scrubbed with lime or calcium hydroxide $Ca(OH)_2$, these vapors yield water-soluble calcium halides or hypohalides that can be recycled to the reactor while calcium carbonate $CaCO_3$, which is insoluble, can be filtered off and removed from the system. Thus, the use of calcium hydroxide as a base proves to be much more attractive than sodium hydroxide, which gives soluble carbonate and does not allow separation of carbonate from halogens salts.

Second, at the step of precipitation of gold, in order to recover gold from the pregnant solution, the ORP of this pregnant solution, which is in the range between about 0.7 and about 1.2 V vs a Ag/AgCl reference electrode, must be reduced to values lower than about 400 mv in order to bring the trivalent gold to elemental state. There is a variety of reducers that can achieve this ORP reduction.

Sulfur dioxide $SO_2$, which is typically available on site from the oxidation of the starting ore, is the preferred reagent. This ORP reduction is accompanied by an acidification of the solution by the formation of sulfuric acid from the oxidation of the reducer $SO_2$. The pH of the solution has to be adjusted by neutralization. Calcium hydroxide can be used in molar equivalent to excess $SO_2$, but precipitation of gypsum must not deprive the brine of its halides components, i.e. NaCl and NaBr, by coprecipitation. Appropriate rinsing, i. e. with at least a double displacement (volume of water twice the volume of the solid to be rinsed), prevents this undesirable effect. Oxidized and excess sulfur dioxide $SO_2$ are removed as sulfate $SO_4^{2-}$ and sulfite of calcium $CaSO_3$ respectively, these salts of low solubility leaving a small background of calcium in the brine, i.e. down to the solubility of $CaSO_4$.

Thirdly, at the stage of purification of the barren solution, the barren solution, i.e. free of gold/silver, has to be purified before regeneration of hypohalides by electrolysis. The main impurity is iron collected at the stage of gold extraction. Also, the small amount of dissolved gypsum, typically around 600 ppm of $Ca^{++}$, must be reduced by a factor of ten in order to preserve the properties of the electrodes in the electrolytic cell.

The removal of the iron can be done by pH increase of the brine to a range between about 8 and about 9, by addition of calcium hydroxide. The other minor contaminants, essentially base metals, arsenic, antimony and bismuth, are also precipitated by this treatment.

The reduction of the level of alkaline earth elements (Ca, Mg) can be achieved by carbonatation of the brine, these carbonates being in equilibrium with less than 50 ppm of $Ca^{++}/Mg^{++}$.

These interventions with $Ca(OH)_2$ on the brine loop thus prevent halogen losses, while maintaining the desired capabilities for gold/silver extraction.

With the use of calcium hydroxide rather than sodium hydroxide as a neutralizing agent, it has been possible to prevent the build-up of undesirable ion in the brine, to maintain the Cl/Br ratio in the brine, to retain the halogens from precipitated phases and to maintain the calcium level at values compatible with the electrochemical recycling of the brine.

The following examples illustrate in a non limitative manner the main features of this invention.

Scrubbing Chlorine, Bromine and Carbon Dioxide with Calcium Hydroxide.

A 200 ml solution of sodium hypochlorite NaOCl (2%) and sodium hypobromite NaOBr in a one-liter three necks flask was acidified to reach a pH comprised in a range between 0.5 and 3, with a preferred value of 2, by slow addition of sulfuric acid $H_2SO_4$ 40% over a period of one hour. During this period, a stream of nitrogen (100 ml/min) was circulated through the flask and directed towards a vertical column, 10 cm in diameter and two meters in length through which a sprayed slurry of calcium hydroxide at 10% solid was circulated (2 liter/min). Gas analysis at the outlet indicated a complete adsorption of chlorine, bromine and carbon dioxide while in the slurry the halogen existed as hypohalides and halides of calcium.

Gold Extraction with Hypohalides of Calcium.

In the course of two simultaneous and otherwise identical experiments, a gold ore (11.25 g/t Au) was treated with i) sodium halide/hypohalide mixture and ii) with calcium halide/hypohalide respectively, using 8% brine with a NaCl to NaBr ratio in a range between about 7/1 and about 7/3, 20% ore slurry at 30-40° C. for four hours, i. e. using an amount of active halogens in a range comprised between about 0.5 and about 2 percent of the ore, the oxido-reduction potential in the reactor being in a range comprised between about 0.7 and about 1.2 V vs a Ag/AgCl reference electrode. It was found that the gold recovery was identical in both experiments, i.e. at the level of about 95%, this showing that the substitution of sodium by calcium in the halide/hypohalide reagent does not affect the gold extraction.

Purification of the Barren Brine Prior to the Electrolysis.

A barren solution from gold recovery by chlorination was showing the following composition: $CaSO_4$: 0.99 g/l; $CuSO_4$: 1.637 g/l; $Fe_2(SO_4)_3$: 15.98 g/l; $H_2SO_4$: 3.67 g/l; $MgSO_4$: 0.10 g/l; $MnSO_4$: 0.018 g/l; NaBr: 0.97 g/l; NaCl: 44.8 g/l; $Na_2SO_3$: 4.15 g/l; $Na_2SO_4$: 31.22 g/l; $PbSO_4$: 0.094 g/l. One liter of this barren solution was treated with an excess of calcium hydroxide to pH 8.2. The precipitated solid was filtered and the filtrate, after rinsings (two displacements), contained the initial amounts of NaCl and NaBr. Carbonatation of this purified brine brought down the ratio $Ca^{++}/Mg^{++}$ below 50 ppm.

Figure 2:
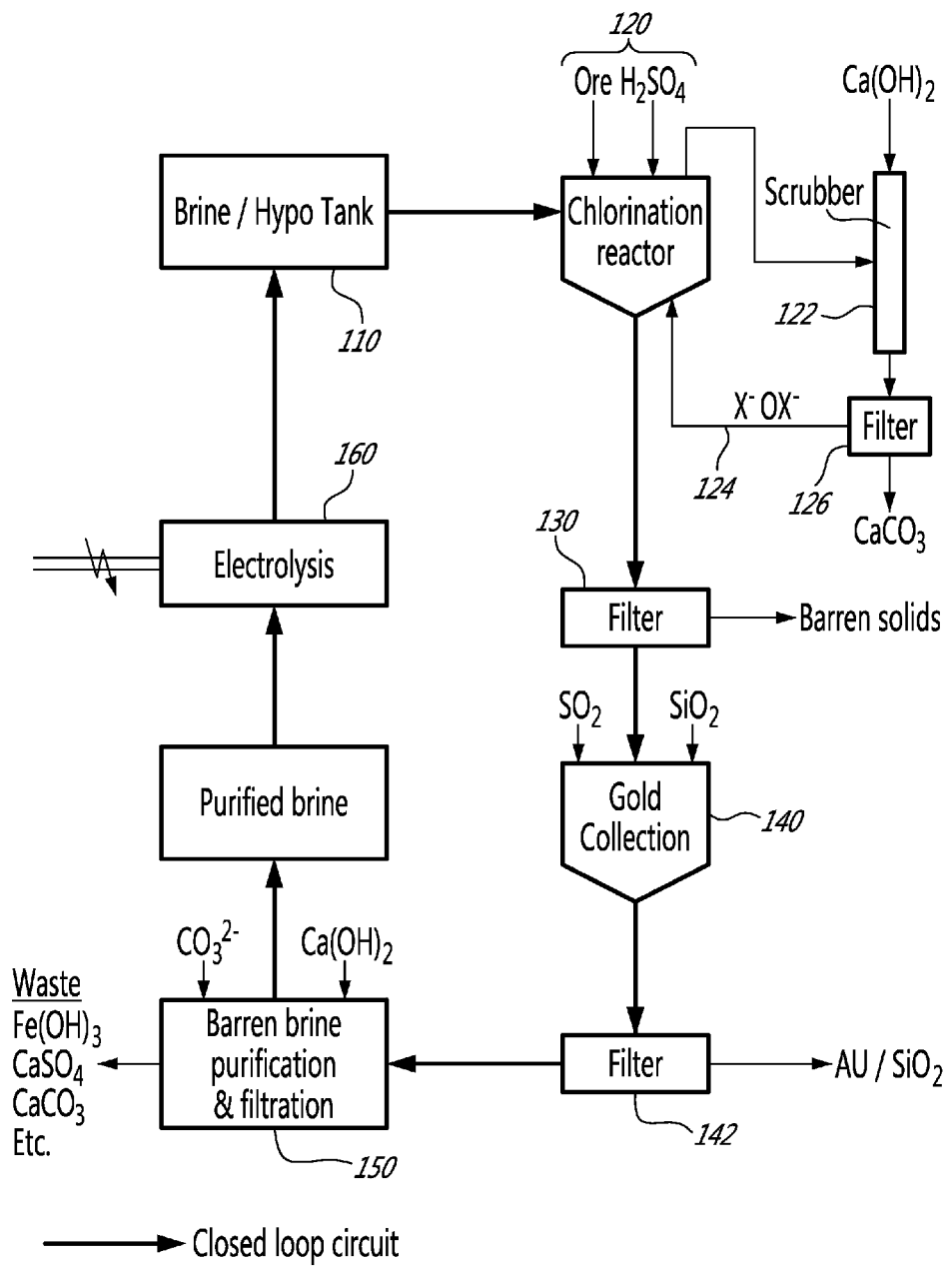
FIG. 2 is a diagrammatic view of a method for gold/silver extraction using halogens according to an embodiment of an aspect of the present invention.

Thus, as illustrated in FIG. 2, there is provided a method for gold and silver extraction, comprising generating hypochlorites from a salt brine (step 110); chlorination of the ore using hypochlorites under acidic conditions (step 120); filtering to collect a pregnant solution (step 130); treating the pregnant solution for gold collection (step 140) and filtering (step 142) to recover the Au/Ag on the one hand and the barren brine on the other hand; purification of the gold/silver depleted brine, i. e. the barren solution (step 150), before circulating the purified barren solution though an a membrane less electrolytic cell for regenerating the halogens (160), yielding a regenerated brine with hypohalides. Calcium hydroxide is used instead of sodium hydroxide as a base at three steps of the method, as described hereinbelow.

In step 120, halogens from the chlorinating reactor are scrubbed using a calcium hydroxide $Ca(OH)_2$ slurry with $Ca(OH)_2$ content in a range between 2 and 10% in weight, preferably 5%, is used to recover the halogens values from the chlorination reactor (step 122). As described hereinabove, the barren ore, along with gypsum, is filtered off (step 126) to yield a solution with gold/silver and calcium hypohalides $Ca(OBr)_2$, $Ca(OCl)_2$, which is recirculated to the chlorination reactor (step 124), and calcium carbonate $CaCO_3$, which is removed from the system At the step of precipitation of gold, in order to recover gold from the pregnant solution the ORP of the pregnant solution, which is in the range between about 0.7 and about 1.2 V vs a Ag/AgCl reference electrode, must be reduced to values lower than about 400 mv in order to bring the trivalent gold to elemental state. There is a variety of reducers that can achieve this ORP reduction. In step 140, sulfur dioxide $SO_2$, which is typically available on site from the oxidation of the starting ore, is used as a reducing reagent. This ORP reduction is accompanied by an acidification of the solution by the formation of sulfuric acid from the oxidation of the reducer $SO_2$.

The pH of the solution has to be adjusted by neutralization. Calcium hydroxide is used in molar equivalent to excess $SO_2$, but precipitation of gypsum must not deprive the brine of its halides components, i.e. NaCl and NaBr, by coprecipitation. Appropriate rinsing, i. e. with at least a double displacement (volume of water twice the volume of the solid to be rinsed), prevents this undesirable effect. Oxidized and excess sulfur dioxide $SO_2$ are removed as sulfate $SO_4^{2-}$ and sulfite of calcium $CaSO_3$ respectively, these salts of low solubility leaving a small background of calcium in the brine, i.e. down to the solubility of $CaSO_4$.

Step 150 comprises increasing the pH of the brine with calcium hydroxide to a value in a range between about 8 and about 9 which precipitates the iron, and other minor contaminants, essentially base metals, arsenic, antimony and bismuth, and carbonatation of the brine, which reduces the level of alkaline earth elements (Ca, Mg).

There is thus provided, in a closed loop gold extraction method using sodium chloride/sodium bromide brine as carrier for hypohalides oxidizers, an improvement which consists of substituting sodium hydroxide by calcium hydroxide for scrubbing and neutralization purposes, thus preventing sodium build-up in the loop while preserving the halogens content of the brine.

In the present method, calcium hydroxide is substituted to sodium hydroxide for the scrubbing of the halogens vapors and carbon dioxide emissions, thus allowing the recycling of halogen values to the loop while discarding the carbon dioxide as calcium carbonate.

Calcium hydroxide is substituted to sodium hydroxide in order to collect the extracted gold, said calcium hydroxide precipitating the reducing agent as insoluble calcium sulfite/calcium sulfate after reduction of gold chloride to elemental gold.

Calcium hydroxide is substituted to sodium hydroxide in order to remove impurities from the barren brine by pH adjustment, said precipitated impurities, mainly iron with traces of other base metals, being filtered off and residual alkaline earth ions reduced to a level below 50 ppm by carbonatation.

Calcium hydroxide is used as a slurry in water containing from 1 to 20% by weight of calcium hydroxide with a preferred value at 5%.

As people in the art will appreciate, there is thus provided a method for gold and silver extraction by halogens, chlorine and bromine, where the reagents are recycled and reactivated in a closed loop. In the present method, the steps where external adjunctions of chemical reagents are required to retain halogens in the loop, to collect the precious metals from the pregnant solution and to purify the barren solution prior to regeneration by electrolysis are achieved using calcium hydroxide as a base, without creating imbalance in the ionic composition of the brine in the loop.

In a closed loop, the present gold/silver extraction method comprises using sodium chloride/sodium bromide brine as carrier for hypohalides oxidizers, and calcium hydroxide for scrubbing and neutralization purposes, thus preventing a sodium build-up in the loop while preserving the halogens content of the brine.

Calcium hydroxide is used for the scrubbing of the halogens vapors and carbon dioxide emissions, thus allowing the recycling of halogen values to the loop while discarding the carbon dioxide as calcium carbonate.

Calcium hydroxide is used in order to collect the extracted gold, the calcium hydroxide precipitating the reducing agent as insoluble calcium sulfite/calcium sulfate after reduction of gold chloride to elemental gold.

Calcium hydroxide is used in order to remove impurities from the barren brine by pH adjustment, the precipitated impurities, mainly iron with traces of other base metals, being filtered off and residual alkaline earth ions reduced to a level below 50 ppm by carbonatation.

Calcium hydroxide is used as a slurry in water containing from 1 to 20% by weight of calcium hydroxide with a preferred value at 5%.

The scope of the claims should not be limited by the preferred embodiments set forth in the examples, but should be given the broadest interpretation consistent with the description as a whole.

The invention claimed is:

1. A method for extracting precious metals from a polymetallic ore, comprising:
   a) generating hypochlorites from a salt brine;
   b) chlorination of the ore using hypochlorites under acidic conditions;
   c) filtering to collect a pregnant solution and treating the pregnant solution for collection of precious metals;
   d) filtering to separate the precious metals and a barren brine;
   e) purifying the barren brine; and
   f) recycling halogens from the purified brine in the form of hypohalites formed by electrolysis of the purified brine, and comprising hypochlorite and hypobromite;
   wherein:
   said step b) further comprises scrubbing excess halogens using calcium hydroxide;
   said treating the pregnant solution in step c) comprises reducing an oxido reduction potential of the pregnant solution and using calcium hydroxide for neutralization; and
   said step e) comprises increasing the pH of the barren brine by addition of calcium hydroxide; and
   wherein, in step c), reducing the oxido reduction potential of the pregnant solution comprises using sulfur dioxide and using calcium hydroxide for neutralization comprises using calcium hydroxide in molar equivalent to excess sulfur dioxide and rinsing.

2. The method of claim 1, wherein said scrubbing excess halogens in step b) uses a calcium hydroxide slurry with a calcium hydroxide content in a range between about 2 and about 10% in weight.

3. The method of claim 1, wherein said scrubbing excess halogens in step b) uses a calcium hydroxide slurry with a calcium hydroxide content of about 5% in weight.

4. The method of claim 1, wherein in step b) a oxido-reduction potential is in a range comprised between about 0.7 and about 1.2 V vs a Ag/AgCl reference electrode.

5. The method of claim 1, wherein in step b) a oxido-reduction potential is in a range comprised between about 0.7 and about 1.2 V vs a Ag/AgCl reference electrode, and said step c) comprises reducing the oxido-reduction potential to less than about 0.4V vs a Ag/AgCl reference electrode.

6. The method of claim 1, wherein step e) comprises increasing the pH of the barren brine to a value in a range between about 8 and about 9.

7. The method of claim 1, wherein said step b) comprises slurrying the ore in a mixed NaCl/NaBr salt brine and acidifying the slurried ore to reach a pH comprised in a range between about 0.5 and about 3.

8. The method of claim 1, wherein said step a) comprises generating the hypohalites by electrolysis of the brine in a diaphragm-less cell.

9. The method of claim 1, wherein said step b) comprises contacting an acidic slurried ore with a solution of recycled hypohalites.

10. The method of claim 1, wherein step b) comprises acidifying the slurried ore to a pH of about 1.5.

11. The method of claim 1, wherein said step b) comprises using an amount of active halogens in a range comprised between about 0.5 and about 2 weight percent of the ore.

12. The method of claim 1, wherein said step b) comprises slurrying the ore at a temperature of about 40° C.

13. The method of claim 1, wherein said precious metals are at least one of gold and silver.

* * * * *